(12) United States Patent
Behrens et al.

(10) Patent No.: US 7,424,685 B2
(45) Date of Patent: Sep. 9, 2008

(54) PROVIDING ACCESS TO DATABASE OBJECTS

(75) Inventors: Christian Behrens, Leimen (DE); Rene Dehn, Sinsheim (DE); Peter Weddeling, Sinsheim (DE); Steffen Rotsch, Rauenberg (DE); Volker Paul, Ruelzheim (DE)

(73) Assignee: SAP Aktiengesellschaft, Walldorf (DE)

( * ) Notice: Subject to any disclaimer, the term of this patent is extended or adjusted under 35 U.S.C. 154(b) by 703 days.

(21) Appl. No.: 10/698,844

(22) Filed: Oct. 31, 2003

(65) Prior Publication Data

US 2005/0097568 A1  May 5, 2005

(51) Int. Cl.
*G06F 3/048* (2006.01)
(52) U.S. Cl. .................. 715/777; 715/708; 715/781
(58) Field of Classification Search ............... 715/764, 715/777, 781, 730, 780, 705, 708, 748, 751, 715/810, 824, 744
See application file for complete search history.

(56) References Cited

U.S. PATENT DOCUMENTS

| | | | | |
|---|---|---|---|---|
| 5,428,731 A | * | 6/1995 | Powers, III | 715/501.1 |
| 6,396,475 B1 | * | 5/2002 | Ellenby et al. | 345/156 |
| 6,859,214 B2 | * | 2/2005 | Williams et al. | 715/781 |
| 2002/0180796 A1 | * | 12/2002 | Millmore et al. | 345/780 |
| 2003/0184584 A1 | * | 10/2003 | Vachuska et al. | 345/762 |
| 2004/0221263 A1 | * | 11/2004 | Arend et al. | 717/113 |
| 2004/0230914 A1 | * | 11/2004 | Arend et al. | 715/804 |
| 2005/0071784 A1 | * | 3/2005 | Klein et al. | 715/851 |

OTHER PUBLICATIONS

Screen snapshot of the "Siebel 7" product from Siebel Systems.
Screen snapshot of the "Siebel ERM" product from Siebel Systems.
Microsoft Corporation, "The Windows Interface Guidelines for Software Design", *Microsoft Press*, 1995, pp. 415-420.
"TeamPoint 4i User Guide", *Point Information Systems, Ltd.*, Embassy House, Ballsbridge, Dublin, Ireland, Nov. 30, 1999.
"Maximizer 7 User's Guide", *Multiactive Software, Inc.*, obtained from the Internet at http://maximizer2.data-fortress.com/mktgadmin/support/downloads/maximizer/max070_usersguide.pdf> on Mar. 8, 2005.

(Continued)

*Primary Examiner*—Weilun Lo
*Assistant Examiner*—Rashedul Hassan
(74) *Attorney, Agent, or Firm*—Fish & Richardson P.C.

(57) ABSTRACT

Providing access to database objects is described. An object selection area capable of presenting representations of a plurality of database objects is displayed. Each of the database objects is associated with one of a plurality of predetermined contexts. A plurality of panels are capable of presenting portions of data belonging to database objects selected in the object selection area. Some panels are relevant to more than one of the contexts. An input from the user selecting a database object presented in the object selection area is received. A panel selection control associated with the context of the selected database object is displayed. The control provides that the user can select for display any panel that is relevant to the selected object's context. Any of the selectable panels that are relevant also to a different context can also be selected in a panel selection control associated with the different context.

16 Claims, 4 Drawing Sheets

OTHER PUBLICATIONS

Viktor Toth, "Visual C++ Unleashed", *Sams Publishing,* Indianapolis, Indiana, USA, Jan. 1996, pp. 111-112.

"The Windows Interface Guidelines for Software Design", *Microsoft Press,* Redmond, Washington, USA, 1995, pp. 136 and 143.

"JAR File Specification", *Sun Microsystems, Inc.,* obtained from the Internet at http://java.sun.com/j2se/1.3/docs/guide/jar/jar.html> on Mar. 9, 2003.

* cited by examiner

US 7,424,685 B2

PROVIDING ACCESS TO DATABASE OBJECTS

TECHNICAL FIELD

The invention relates to providing access to database objects that are associated with contexts.

BACKGROUND

Some software programs that provide access to database objects may be used to manage human resources records of an organization, such as a database of all employees. A user of such a program can access a database object representing a certain employee and review or edit data relating to the employee. Such objects are often identified by an employee identification number assigned by the organization.

Multi-national organizations have employees in several different countries and may need record management programs that handle employee records for more than one country. The nature of relevant employee data can also depend on the country where the employee is stationed. U.S. employees, for example, likely have Social Security numbers (SSN) that the organization may want to store as part of the employees' respective database objects. The program may allow access to a U.S. employee's SSN by displaying it in a field having the suitable format: NNN-NN-NNNN. Such a field should not be used, however, with employees for whom no SSN will be recorded, such as employees in non-U.S. countries. These employees may, on the other hand, have other country-specific information that the organization wishes to record that does not apply to U.S. employees. In addition, taking specific actions with regard to employees may involve revising or adding different portions of employee data depending on the employee's country. For example, the data recorded when hiring or reassigning an employee may be different in Germany than in the United States.

A program sold as part of the R/3 system manufactured by SAP AG implements country-specific access based on who is accessing the employee record. That is, a person based in the United States who accesses employee records will see each record formatted as if it were a U.S. employee, regardless of what country the employee is actually assigned to. One disadvantage of this approach is that country-specific information about an employee may be invisible if the record is displayed to a user from a different country. Another disadvantage is that it may be difficult to enter country-specific information if the current formatting does not provide input field(s) for it.

SUMMARY

The invention relates to providing access to database objects. In a first general aspect, a method comprises displaying in a computer user interface an object selection area capable of presenting representations of a plurality of database objects for selection by a user. Each of the database objects is associated with one of a plurality of predetermined contexts. The user interface comprises a plurality of panels for presenting portions of data belonging to database objects selected in the object selection area. Some of the panels are relevant to more than one of the contexts. An input is received from the user selecting a database object presented in the object selection area. The method comprises displaying in the user interface a panel selection control associated with the context of the selected database object. The panel selection control provides that the user can select for display any of the panels that are relevant to the context of the selected database object. Any of the selectable panels that are relevant also to a different context can also be selected in a panel selection control associated with the different context.

In selected embodiments, the panel selection control is selected among a plurality of panel selection controls associated with respective contexts. An event may be generated that is associated with the context of the selected object and the panel selection control may be selected using the generated event. Each of the panel selection controls may have events associated with them, and selecting the panel selection control may comprise deactivating any of the panel selection controls for which the generated event does not match.

In selected embodiments, the panel selection control is capable of receiving content for any of the contexts, and the panel selection control is provided with a content for the context of the selected database object.

In a second general aspect, a computer system comprises database objects that comprise data portions, each database object being associated with one of a plurality of predetermined contexts. The system comprises panels that can be displayed in a user interface. Each panel is capable of presenting at least one data portion belonging to a selected object. At least a first panel is relevant to only one of the contexts and at least a second panel is relevant to more than one of the contexts. The system comprises panel selection controls that can be displayed in the user interface. Each panel selection control is associated with one of the contexts. The first panel can be selected in a panel selection control associated with the context to which the first panel is relevant and the second panel can be selected in any of the panel selection controls associated with the contexts to which the second panel is relevant.

In a third general aspect, a repository comprises a plurality of panels that can be displayed in a computer user interface to present portions of data belonging to database objects. Each data object is associated with one of a plurality of predetermined contexts. At least a first panel is relevant to only one of the contexts and at least a second panel being relevant to more than one of the contexts. Panels relevant to a selected context can be retrieved from the repository.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numerals in the various drawings indicate like elements.

DETAILED DESCRIPTION

Figure 1:
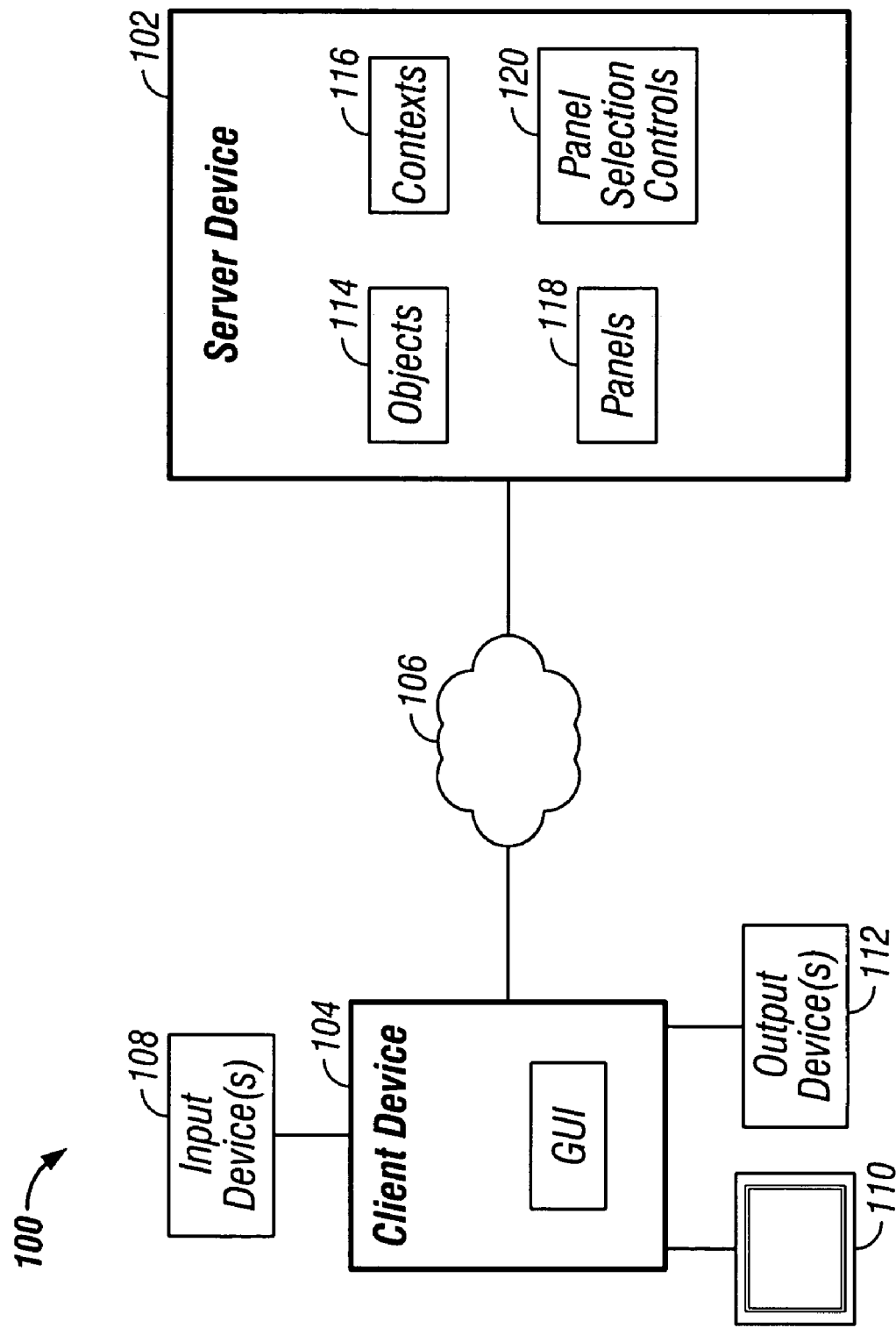
FIG. 1 shows a block diagram of a computer system capable of providing access to database objects.

FIG. 1 shows a computer system 100 with a server device 102 and a client device 104 connected through a network 106. A user can access information on the server device 102 using input device(s) 108, display device 110 and output device(s) 112 operably connected to the client device 104. For example, the user may access one or more database objects 114 stored on the server device 102.

Each of the objects 114 may have a particular context 116 assigned to it. As one example, an assigned context may be a country with which the object is associated. If the object 114 represents an employee, the context 116 may be the country where the employee is stationed. Contexts 116 are not necessarily countries, however. A person working for the government or in a public position may require at least partially different data records than employees of a private enterprise in the same country. Accordingly, contexts 116 can be any entities associated with the objects 114 that affect what data particular object(s) should contain.

The server device 102 comprises panels 118 for presenting data portions of the objects 114. Among the panels 118 may be one or more single-context panels 206, 212 (see FIGS. 2A, 2B) that are relevant only for presenting data portions of objects 114 associated with a specific one of the contexts 116. Panels 118 may include one or more multi-context panels 208 (see FIG. 2A) that are relevant for presenting data portions of objects 114 associated with more than one of the contexts 116. That is, the multi-context panel 208 can present data portions of one of the objects 114 associated with one of the contexts 116 and can present data portions of another one of the objects 114 associated with a different one of the contexts 116. The server device 102 comprises panel selection controls 120 by which the user can select any of the panels 118 relating to a particular object 114 for display.

An example of providing access to the objects 114 will be described with reference to FIGS. 2A and B. The system 100 displays 502 (see FIG. 5) an object selection area 202 by which the user can retrieve one or more of the objects 114. As an example, the object selection area 202 comprises a text search function for finding objects 114 matching an entered search string. The object selection area 202 presents representation(s) of the retrieved object(s) for selection by the user. For example, the object selection area 202 presents a list of objects that the user can select between using input device(s) 108, such as a pointing device. The system 100 receives 504 (see FIG. 5) input from the user selecting one of the objects 114 associated with one of the contexts 116. The system 100 displays 506 (see FIG. 5) a panel selection control 204 associated with the context 116 of the selected object 114. Examples relating to the panel selection controls 120 will be described later.

The panel selection control 204 can be used to select one or more of the panels 118 for display. The panel selection control 204 can provide display of any of the panels 118 that are relevant to the context 116 of the selected object 114. In this example, the user activates panel selection control 204 to cause panels 206 and 208 to be displayed. Single-context panel 206 is relevant only to the context 116 of the selected object 114. For example, single-context panel 206 may present data portions that occur only in objects 114 associated with a single context 116, such as data portions being specific to a single country. Multi-context panel 208, in contrast, presents data portions that are relevant also to at least one other context 116.

Thus, at a time T0 (indicated in FIG. 2A), the system displays an object selection area 202 by which the user has selected an object associated with a context, a panel selection control 204 associated with the context of the selected object, and one or more panels 206, 208 for presenting data portions of the selected object. This provides the user access to the selected object 114 because its data portions are presented by the panels selectable through the control 204. In other implementations, the order or appearances of items in the display may be different. For example, panels 206 and 208 may be displayed "on top of each other in a stack" such that the user can pick one of them for display using a tab or the like.

The user may wish to access another one of the objects 114. The user may retrieve the new object using object selection area 202. For example, if the object selection area 202 already lists several objects at time T0 (perhaps as results of a performed query), the user may proceed by selecting a different object than in FIG. 2A.

Figure 2A:
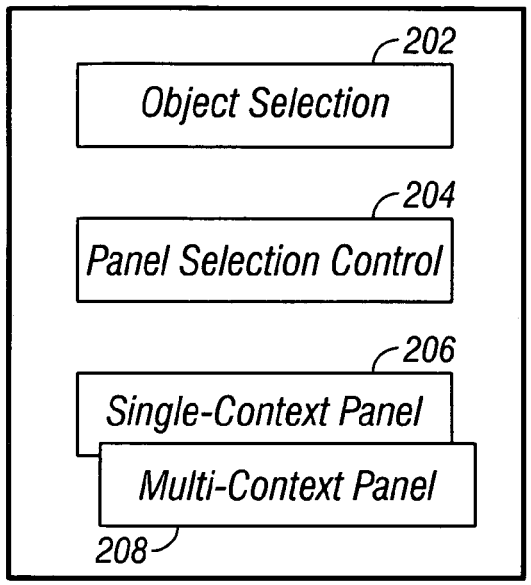
FIGS. 2A-B, 3 and 4 schematically show views displayed by the system shown in FIG. 1.

For purposes of illustration, the newly selected object 114 is associated with a different context than the one selected in FIG. 2A. The system displays a panel selection control 210 associated with the context of the selected object, which control provides that the user can select for display any of the panels 118 that are relevant to that context. Here, the user activates the control 210 to have panels 208 and 212 displayed. Multi-context panel 208 was displayed also in the FIG. 2A example. Single-context panel 212, in contrast, is relevant only to the context of the newly selected object.

Figure 2B:
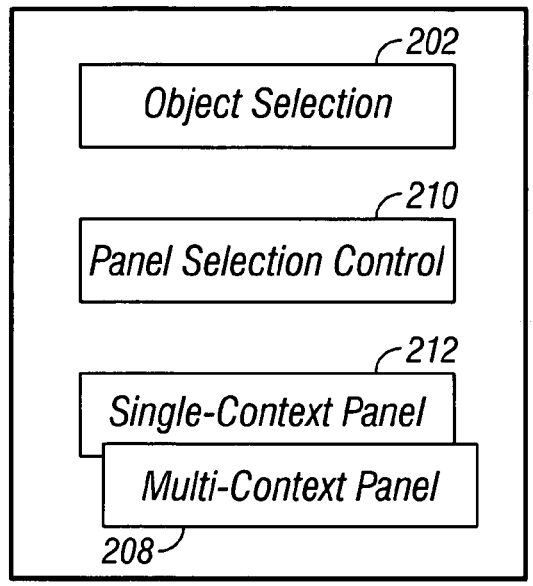

Thus, at a time T1 (as indicated in FIG. 2B) the system displays an object selection area 202 by which the user has selected an object associated with a context, a panel selection control 210 associated with the context of the selected object, and one or more panels 208, 212 for presenting data portions of the selected object. This provides the user access to the selected object 114 because its data portions are presented by the panels selectable through the control 210.

Figure 3:
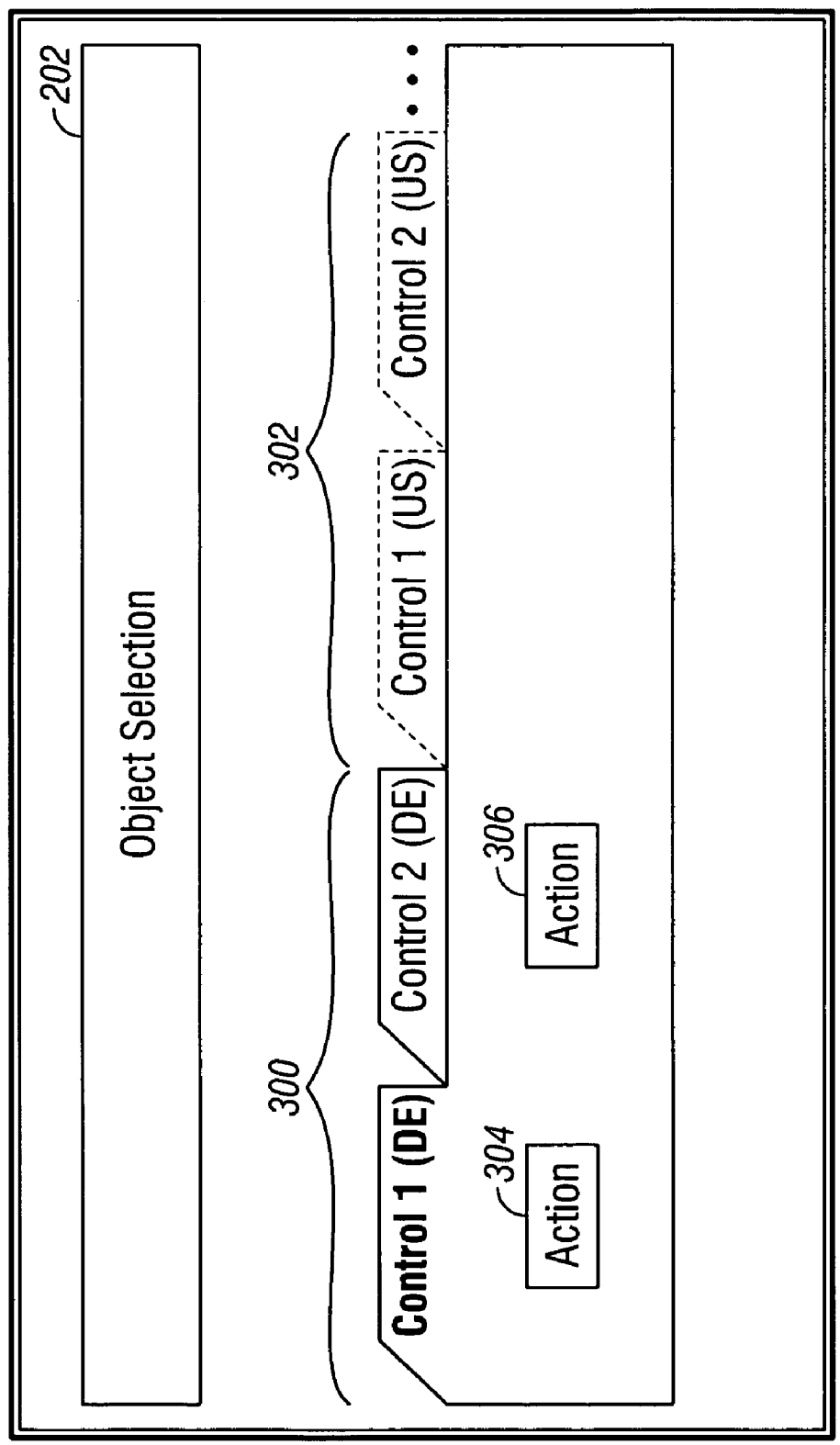

Examples of panel selection controls 120 and their operation will now be described. FIG. 3 shows panel selection controls 300 and 302 which are examples of an approach where panel selection controls 120 include (at least) one control for each specific context 116. Here, the panel selection control 300 includes Controls 1 and 2 for German objects (that is, the control 300 is associated with the context Germany (DE)). The control 302 is associated with the context United States and includes Controls 1 and 2 labeled "US". There may be other panel selection controls as indicated by the ellipsis ( . . . ), such as controls for contexts corresponding to other countries. The control 302 is shown in phantom, which will now be described.

When the system receives 504 the user input selecting an object 114, it may select one of the controls 300, 302 that is associated with the context of the selected object. For example, an event associated with that context may be triggered in the system 100. Using the event, the system selects the panel selection control 300, 302, . . . which is associated with the relevant context 116. For example, each of the panel selection controls 300, 302, . . . may have events associated with them such that the occurrence of a particular event will cause the corresponding panel selection control to be triggered. In a particular implementation, the system 100 evaluates for each of the panel selection controls 300, 302, . . . whether it is associated with the event that was triggered by receiving the object with the specific context 116. Panel selection control(s) 300, 302, . . . not associated with the triggered event may be deactivated or otherwise hidden, as indicated by control 302 being shown in phantom. The control(s) not deactivated, in contrast, are displayed 506 to provide that the user can select among the relevant panels 118.

In this example, Control 1 (DE) may relate to taking particular actions in relation to a German object. Action controls 304 and 306 can be activated to perform their associated actions on the selected German object. For example, selecting the action(s) 304, 306 may cause one or more of the panels relevant to the selected German object to be displayed. Control 2 (DE), in contrast, may relate to particular sections of master data for the selected German object, and may have controls analogous to the controls 304, 306 that cause one or more panels to be displayed. One or more of the panels 118 that appears using one control 304, 306 may also be accessible through another control 304, 306. Any deactivated control(s) 302, . . . not currently displayed may be displayed if the user selects an object associated with their respective contexts.

Figure 4:
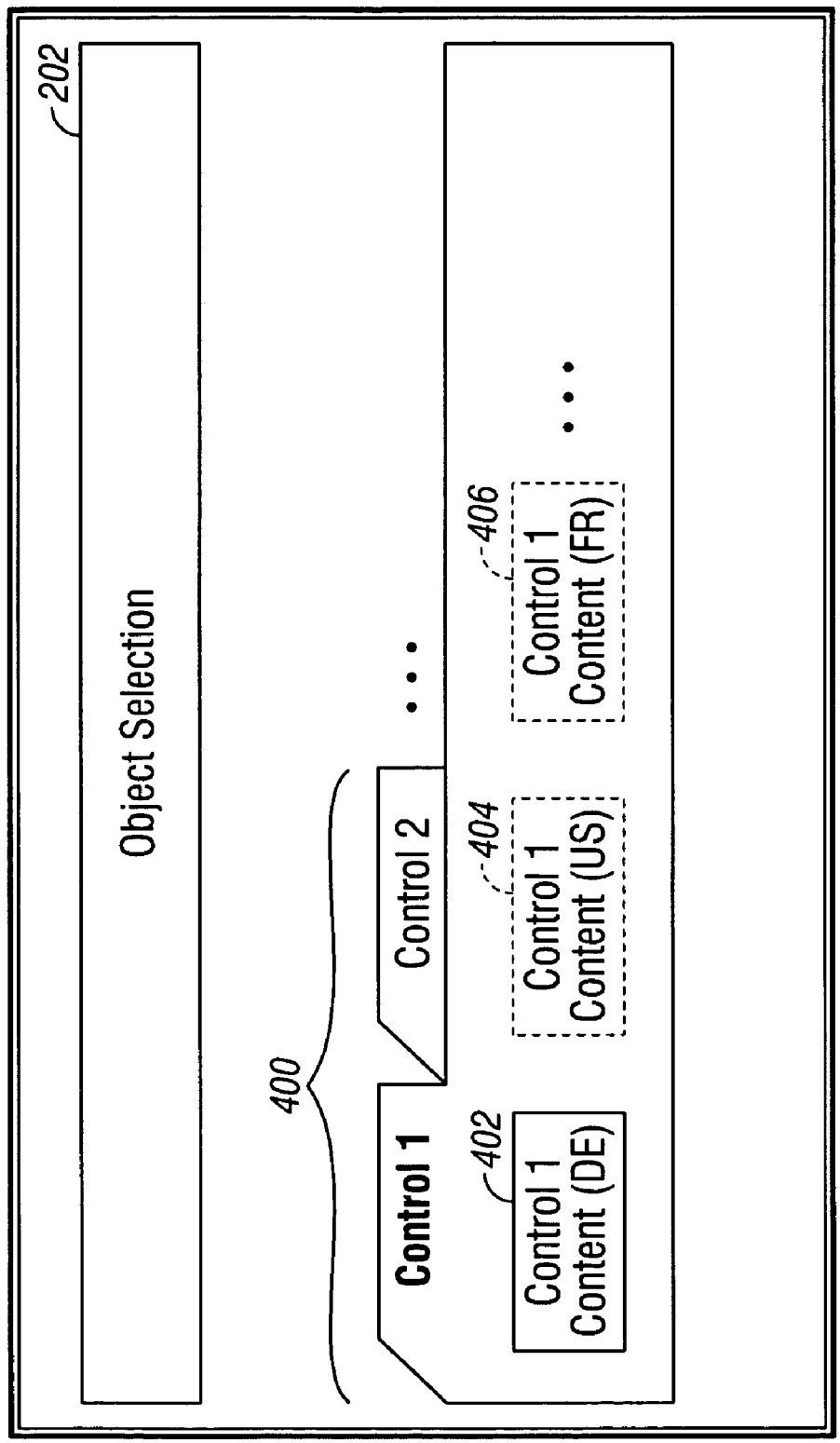

FIG. 4 shows a generic panel selection control 400 capable of receiving content 402, 404, 406, . . . for specific contexts 116. In this example, the generic control 400 includes Control 1 and Control 2 which may receive respective contents to function similarly to the "actions" and "master data" example described above with regard to Control 1 (DE). The panel selection control 400 is currently provided with Control 1 Content (DE). It is not currently provided with Control 1 Content (US) 404 and Control 1 Content (FR) 406 as will now be described.

When the system receives 504 the user input selecting an object in object selection area 202, it may provide content 402 to the generic panel selection control 400. The content is selected because it relates to the context of the selected object 114. The panel selection control is displayed 506 to provide that the user can select among the relevant panels 118. If the user selects an object 114 associated with a different one of the contexts 116, the system may instead provide a content 404, 406, . . . relating to the different context to the generic panel selection control 400 and display 506 it.

Figure 5:
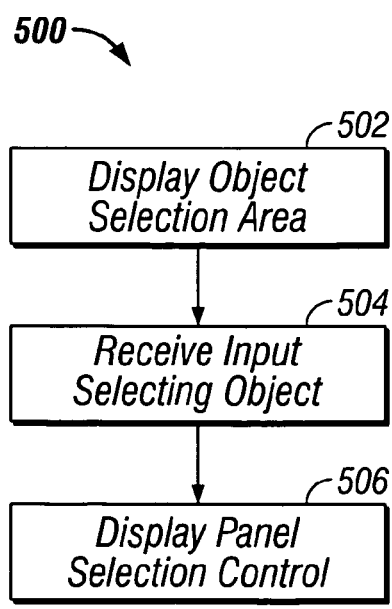
FIG. 5 shows a flow chart of a method of providing access to database objects.

FIG. 5 shows a simplified flow chart for a method 500 of providing access to database objects 114. Preferably, the method is executed by a server device. For example, a computer program product can include instructions that cause a processor of the server device to execute the steps of method 500. As shown in FIG. 5, method 500 includes the following steps:

Display 502 an object selection area 202 capable of presenting representations of a plurality of database objects 114 for selection by a user, the objects 114 being associated with contexts 116.

Receive 504 input from the user selecting a database object 114 presented in the object selection area 202.

Display a panel selection control 120 associated with the context 116 of the selected object 114, the panel selection control 120 providing that the user can select for display any of the panels 118 that are relevant to the context 116 of the selected object 114.

Advantages of providing access to database objects as described herein may include any or all of the following. Providing improved context-specific access to objects. Providing efficient navigation among data portions of a selected object using panels relevant to the object's context. Providing access to objects of different contexts without having identical panels redundantly stored for each context. Improved switching between presenting objects associated with different contexts, including when at least one panel is relevant to both contexts. Avoiding performance degradation by not initiating panels that are irrelevant to a selected object.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A method of providing access to database objects, the method comprising:

displaying in a computer user interface an object selection area capable of presenting representations of a plurality of database objects for selection by a user, the plurality of database objects being of a type that is configured to include a plurality of data portions, each of the database objects having stored therewith one of a plurality of predetermined contexts applicable to the type of the database objects, the one predetermined context defining that at least one of the plurality of data portions is relevant for the predefined context, the user interface comprising a plurality of panels for presenting portions of data belonging to database objects selected in the object selection area, some of which panels are relevant to more than one of the contexts;

receiving an input from the user selecting a database object presented in the object selection area;

identifying, in response to the input, one of the plurality of predetermined contexts that is associated with the selected database object;

selecting one of a plurality of panel selection controls using the identified context, each of the plurality of panel selection controls being associated with one of the predetermined contexts, the selected panel selection control providing that the user can select for display any of the panels that are relevant to the context of the selected database object, wherein any of the selectable panels that are relevant also to a different context can also be selected in a panel selection control associated with the different context; and displaying the selected panel selection control in the user interface.

2. The method of claim 1, further comprising generating an event associated with the context of the selected database object, wherein the panel selection control is selected using the generated event.

3. The method of claim 2, wherein each of the panel selection controls have events associated with them, and wherein selecting the panel selection control comprises deactivating any of the panel selection controls for which the generated event does not match.

4. The method of claim 2, further comprising:
receiving a second input selecting a second database object associated with a second context;
generating a second event associated with the second context; and
using the second event to select a second panel selection control for display in the computer user interface, the second panel selection control being associated with the second context.

5. The method of claim 1, wherein the panel selection control is capable of receiving content for any of the contexts, further comprising providing the panel selection control with a content for the context of the selected database object.

6. The method of claim 5, further comprising:
receiving a second input selecting a second database object associated with a second context; and
providing the panel selection control with a second content for the second context.

7. The method of claim 1, wherein the panel selection control comprises at least two controls that the user can execute in selecting panels for display, each control being associated with at least one of the panels.

8. The method of claim 1, wherein the context of the selected object is selected from the group consisting of: country, employer, and combinations thereof.

9. A computer program product tangibly embodied in a computer readable storage device and containing executable instructions that when executed cause a processor to perform operations comprising:

display in a computer user interface an object selection area capable of presenting representations of a plurality of database objects for selection by a user, the plurality of database objects being of a type that is configured to comprise a plurality of data portions, each of the database objects having stored therewith one of a plurality of predetermined contexts applicable to the type of the database objects, the one predetermined context defining that at least one of the plurality of data portions is relevant for the predefined context, the user interface comprising a plurality of panels for presenting portions of data belonging to database objects selected in the object selection area, some of which panels are relevant to more than one of the contexts;

receive an input from the user selecting a database object presented in the object selection area;

identify, in response to the input, one of the plurality of predetermined contexts that is associated with the selected database object;

select one of a plurality of panel selection controls using the identified context, each of the plurality of panel selection controls being associated with one of the predetermined contexts, the selected panel selection control providing that the user can select for display any of the panels that are relevant to the context of the selected database object, wherein any of the selectable panels that are relevant also to a different context can also be selected in a panel selection control associated with the different context; and display the selected panel selection control in the user interface.

10. A computer system providing access to database objects, the computer system comprising:

database objects that are of a type configured to comprise a plurality of data portions and that are user-selectable, each database object having stored therewith one of a plurality of predetermined contexts applicable to the type of the database objects, the one predetermined context defining that at least one of the plurality of data portions is relevant for the predefined context;

panels that can be displayed in a user interface, each panel being capable of presenting at least one data portion belonging to a selected object, at least a first panel being relevant to only one of the contexts and at least a second panel being relevant to more than one of the contexts; and panel selection controls that can be displayed in the user interface, each panel selection control being associated with one of the contexts, wherein the first panel can be selected in a panel selection control associated with the context to which the first panel is relevant and wherein the second panel can be selected in any of the panel selection controls associated with the contexts to which the second panel is relevant, the system being configured to identify one of the predetermined contexts that is associated with the selected object and select, using the identified context, one of the panel selection controls for display in the user interface;

wherein the database objects, the panels and the panel selection controls are tangibly embodied in at least one computer readable storage device.

11. The computer system of claim 10, wherein each of the panel selection controls is associated with respective events for the contexts, and wherein the system selects one of the panel selection controls for display using an event triggered by a selection of one of the database objects.

12. The computer system of claim 10, wherein the panel selection controls associated with the plurality of contexts are formed by providing content to a generic panel selection control.

13. A repository tangibly embodied in a computer readable storage device and comprising:

a plurality of panels that can be displayed in a computer user interface to present portions of data belonging to database objects that are user-selectable, the plurality of database objects being of a type that is configured to comprise a plurality of data portions, each data object being associated with one of a plurality of predetermined contexts applicable to the type of the database objects, the one predetermined context defining that at least one of the plurality of data portions is relevant for the predefined context, at least a first panel being relevant to only one of the contexts and at least a second panel being relevant to more than one of the contexts, wherein panels relevant to a selected context can be retrieved from the repository; and a plurality of panel selection controls, each selectable using one of the contexts, wherein the first panel can be selected in a panel selection control associated with the context to which the first panel is relevant and wherein the second panel can be selected in any of the panel selection controls associated with the contexts to which the second panel is relevant.

14. The repository of claim 13, wherein the repository is configured for selecting one of the panel selection controls using an event triggered by a selection of a database object associated with the context of the one panel selection control.

15. The repository of claim 13, wherein the panel selection control is formed by providing content for the first context to a generic panel selection control.

16. The repository of claim 13, wherein the selected context comprises at least one of: country, employer, and combinations thereof.

* * * * *